July 4, 1967 F. H. BURGESS ETAL 3,328,907
TAPE REEL WITH IDENTIFYING RING
Filed Jan. 21, 1965 2 Sheets-Sheet 1

INVENTOR
FRANK H. BURGESS, GREGORY MATHUS,
BY, GEORGE F. LYMAN & OTTO MORNINGSTAR,
Wolf, Greenfield & Hieken
ATTORNEYS July 4, 1967 F. H. BURGESS ETAL 3,328,907

TAPE REEL WITH IDENTIFYING RING

Filed Jan. 21, 1965 2 Sheets-Sheet 2

INVENTOR

FRANK H. BURGESS, GREGORY MATHUS,

BY, GEORGE F. LYMAN + OTTO MORNINGSTAR.

Wolf, Greenfield + Hieken

ATTORNEYS

United States Patent Office 3,328,907
Patented July 4, 1967

3,328,907
TAPE REEL WITH IDENTIFYING RING
Frank H. Burgess, Somerset, Mass., Gregory Mathus, West Hartford, Conn., and George F. Lyman, South Hadley, and Otto Morningstar, Brookline, Mass., assignors to Data Packaging Corp., Cambridge, Mass., a corporation of Massachusetts
Filed Jan. 21, 1965, Ser. No. 426,923
6 Claims. (Cl. 40—309)

This invention relates to reels for storing tape and film and more particularly comprises a new and improved reel having an identifying ring.

At the present time most tape reels made either of aluminum, plastic or combinations of the two materials are made in different colors for purposes of identification. The identifying color markings may serve merely to designate the name of the tape manufacturer, but a more important use of color is as a coding to indicate the type of material stored on the tape wound upon the reel. For example, one color, e.g. red, may indicate to the tape manufacturer's customers that the information stored on the tape relates to inventory control while another color such as blue indicates that the tape contains payroll information and the color green that the tape relates to manufacturing, etc. The vast majority of reels now in use are made with plastic reel flanges, and the flanges are made in different colors by the reel manufacturers to suit the requirements of the tape manufacturer. The tape manufacturer must necessarily inventory large quantities of reels having flanges of each of the different colors used in order that they may in turn fill all orders from their customers. These inventory requirements are obviously economically burdensome to tape manufacturers, which in turn must necessarily be reflected in their selling prices.

One important object of this invention is to reduce the inventory requirements of tape manufacturers by enabling them to apply their own color coding to one standard reel.

Another important object of this invention is to provide a reel adapted to receive an identifying marking which once secured in place may not readily be removed.

Still another important object of this invention is to provide a tape reel having a special feature for receiving identifying color rings, which rings are fully protected once they are installed.

Yet another important object of this invention is to provide means for selectively applying identifying color rings on reels made with plastic flanges and aluminum hubs.

One more important object of this invention is to provide a tape reel to which may be secured by the most unskilled laborer identifying color rings.

To accomplish these and other objects the reel of this invention comprises a hub and inner and outer reel flanges. A continuous recess is provided on the outer surface of the outer reel flange adjacent the hub, and a separately fabricated identifying ring is at least semi-permanently secured in the recess.

These and other objects and features of this invention along with its incident advantages will be better understood and appreciated from the following detailed description of one embodiment thereof, selected for purposes of illustration and shown in the accompanying drawing, in which.

Figure 1:
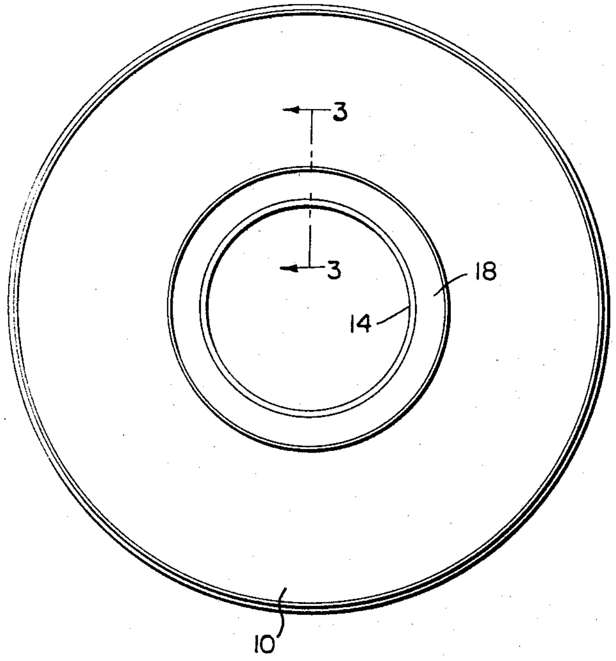
FIG. 1 is a front view of a tape reel constructed in accordance with this invention.

The reel shown in the drawing includes five parts; namely, a front reel flange 10, a back reel flange 12, a hub 14, a lockout ring 16 and an identifying ring 18. Each of these parts is described separately below.

The reel flange 10 is in the form of an annular disc having an opening at its center defined by its inner edge 20. The outer diameter of the flange 10 may be of any desired size. A number of tongues 22 which together describe a cylinder, extend inwardly from the inner surface 24 of the flange 10, and the tongues are concentric with the reel flange. An annular lip 26 extends inwardly from the inner edge 20 of the flange 10 and is generally parallel to the tongues 22. A step or shoulder 28 is formed on the radially inner side of the lip 26 for reasons which are made clear below.

Figure 6:
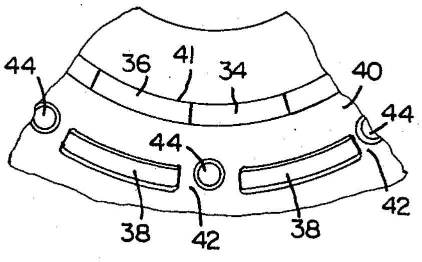
FIG. 6 is a fragmentary view of the inside face of one of the back reel flanges.

The back reel flange 12 is generally the same size as the front reel flange 10 and has an opening at its center defined by its inner edge 30. The inner edge 30 lies at the inner rim 32 which is offset by a step 34 from the plane of the major portion of the reel flange 12. A number of tongues 36, equal in number to those tongues 22 on the front reel flange 10, extend inwardly from the edge of the stepped portion 34 at the outer extremity of the rim 32. A relatively short annular rib 38 extends inwardly from the inner face 40 of the back flange 12 and is spaced radially outwardly from the outer surface 41 of the stepped portion 34. The rib 38 as shown in FIG. 6 is interrupted at a number of locations 42, within which pins 44 are formed to center the back flange 12 on the hub 14. The function performed by the rib 38 and pins 44 will be explained in greater detail below.

The hub 14 in cross section is generally in the shape of an I-beam having an inner hub flange 46, an outer hub flange 48 and a web 50 which joins the two hub flanges. The radially inner surface 52 of the hub flange 46 is machined or otherwise treated so as to be as near cylindrical in shape as possible. The surface 52 is designed to fit about a spindle on a computer or other machine, which rotates to either take up or release tape wound on the reel. The radially outer surface 54 of the outer hub flange 48 is similarly machined precisely parallel to the surface 52 so that when the reel turns, tape that is being wound upon the surface 54 will wind evenly and not become frayed against the inner surfaces 24 and 40 of the front and back reel flanges 10 and 12, respectively. Several arcuate shaped slots 62, equal in number to the tongues 22 and 36, are formed in the web 50. The width of the slots slightly exceeds the width of the tongues.

Figure 3:
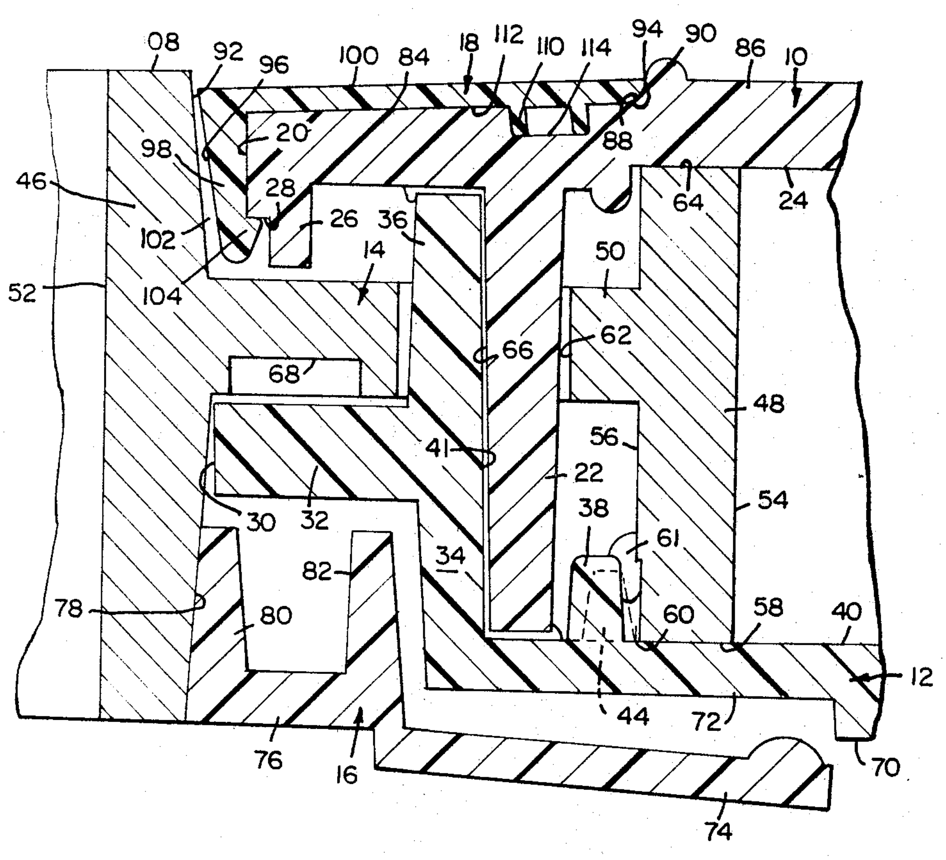
FIG. 3 is a cross-sectional view taken along the section line of 3—3 of FIG. 1.

To assemble the flanges 10 and 12 on the hub 14, a ribbon 61 of a rubber-like cement such as epoxy is deposited on the radially inner surface 56 of the outer hub flange 48 adjacent the lower edge 58 about the entire hub flange 48, and the back reel flange 12 is positioned as shown in FIG. 3. The bottoms of the pins 44 engage the inner corner 60 of the edge 58 of the hub flange 48 to automatically center the flange 12 on the hub. When the reel flange 12 is so mounted on the hub 14, its tongues 36 extend through the spaced slots 62 formed in the web 50 of the hub as is evident in FIG. 3.

A coating of a solvent type cement applied to the outer surface 41 of the stepped portion 34 and the tongues 36 is then utilized to secure the front reel flange 10 in the position shown in FIG. 3. The hub flange 48 serves as a spacer to properly position the reel flanges 10 and 12 with respect to one another and with the hub, by engagement of edges 58 and 64 of the hub flange 48 with the inner surfaces of the reel flanges. The tongues 22 extending inwardly from the inner surface 24 of the reel flange 10 abut against the surface 41 carrying the solvent cement, which further serves to align the two reel flanges. The tongue 22 as shown in FIG. 3 extends through the opening 62 in the web 50 so that the tongue 22 lies in face-to-face contact over substantially its full length with the stepped portion 34 and the tongue 36.

The solvent cement on the surface 41 of reel flange 12 and surface 66 on tongue 22 of reel flange 10 along with the ribbon of rubber-like cement 61 on the surface 56 of the hub flange 48 serve to secure the three major elements together. A shallow recess 68 provided on the lower surface of the hub web 50 may receive an additional deposit of cement to secure the reel flange 12 to the hub. However, cement at that location does not now appear to be necessary and the recess 68 merely serves to lighten the reel. It also does not now appear necessary to deposit cement between the edges 58 and 64 of the outer hub flange 48 and the reel flanges 12 and 10, respectively. However, shallow wells cut in those edges may be provided if necessary to afford room for a thin coating. If cement is used between the hub and flanges, preferably it is a rubber-like cement such as epoxy so that relative expansion may occur between the parts when the hub is aluminum and the flanges are plastic.

Figure 2:
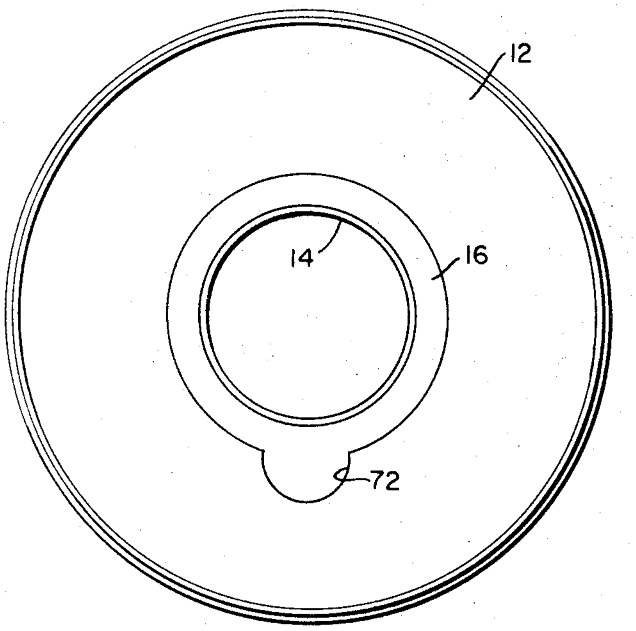
FIG. 2 is a back view of a tape reel constructed in accordance with this invention.

In FIGS. 2 and 3 it will be noted that the outer surface 70 of the back reel flange 12 is provided with a recess 72 which is generally semi-circular in plan and which in FIG. 3 is shown aligned with the tab 74 of the lockout ring 16. The lockout ring 16 includes an inner ring portion 76 and the tab 74, and the ring 76 is sized to provide a friction fit with the tapered radially outer surface 78 of the inner hub flange 46. The inner of the two ribs 80 and 82 on the ring portion 76 bears tightly against the surface 78 to retain the lockout ring in place. However, by pulling the tab 74 the ring may readily be removed. The recess 72 provided in the flange 12 allows a wide variety of different types of lockout rings to be used. Thus, while some use a lockout ring of the shape shown in FIG. 3, others use another common form of lockout ring in which the tab 74 is substantially coplanar with the ring portion 76. The recess 72 provides room for such a tab.

The identifying ring 18 is an important feature of the present invention. As shown in FIG. 3, a shallow recess 84 is provided in the outer surface 86 of the front reel flange 10 to house the identifying ring. The recess 84 is defined in part at its outer edge by wall 88 which merges smoothly into a short half-round bead 90. The inner edge of the shallow recess 84 is defined by the radially outer surface 92 of the upper part of the inner hub flange 46. The shallow recess completely encloses the inner and outer side edges 94 and 96 of the identifying ring so that the edges of the ring cannot become frayed or otherwise unsightly nor can they readily be peeled off the flange 10.

An annular wall 98 extends downwardly from the inner edge 96 of the main portion 100 of the identifying ring 18 and is disposed as shown in FIG. 3 within the gap 102 between the outer surface 92 of the hub flange 46 and the inner edge 20 of the reel flange 10. A number of radially outwardly extending barb-like protrusions 104 are provided on the end of the wall 98 (see FIGS. 3 and 4), which barbs fit below and engage the lower surface of the shoulder 28 on the rib 26 of the reel flange 10 when the identifying ring is assembled. The barbs 104 are spaced about the bottom of the wall 98, and as few as three or four barbs will hold the identifying ring 18 firmly in place.

Figure 4:
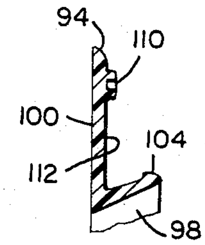
FIG. 4 is a cross-sectional view of one part of the reel shown in its normal shape before installation.
Figure 5:
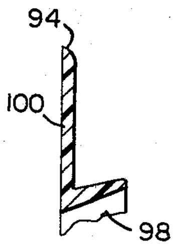
FIG. 5 is a cross-sectional view similar to FIG. 4 but taken along a section displaced circumferentially from that of FIG. 4.

In FIG. 4 the identifying ring 18 is shown alone, and it will be noted that the angle between the wall 98 and the main body portion 100 is somewhat less than the angle between those parts when the identifying ring is mounted on the outer flange 10 as shown in FIG. 3. The flexing of the body portion 100 and/or the wall 98 when the ring is assembled causes the ring particularly adjacent its outer edge 94 to bear tightly against the bottom surface of the recess 84 and it will not bow upwardly at that edge out of the recess. The barbs 104 at the inner edge prevent the inner radial portion of the body adjacent the edge 96 from rising more than a very limited amount off the surface 84, and, therefore, the outer surface of the identifying ring remains well below the top edge 108 of the inner hub flange 46.

A button 110 is formed on the lower surface 112 of the body 100 of the identifying ring, and the button 110 fits within a small cavity 114 in the upper surface of the reel flange 10 within the recess 84. The button 110 and cavity 114 cooperate to prevent the identifying ring 18 from turning on the flange 10 when the identifying ring is assembled.

From the foregoing description it is evident that the identifying ring 18 is separately fabricated from the other elements of the reel. The outer surface of the identifying ring 18 may carry any form of notation such as the name of the owner, a word description of the tape contents, etc., and further, the color of the identifying ring 18 may be used as a means of identifying the contents of the reel. It is now common practice in the computer field to employ reels of different colors to identify the particular type of information stored on tape wound on the reels. As suggested in the introduction, red may designate inventory control as the information carried on the tape, blue may indicate payroll, etc.

With a ring of the type here shown manufactured separately from the reel flange, the reel flanges may be manufactured in a single color and only when the purpose for which the reel is to be used is known may the ring 18 be secured in place to identify the reel tape contents. The owner of the reel may snap into the recess 84 an identifying ring of the appropriate color to indicate that information. The ring 18 is intended to be at least semi-permanently installed, and therefore as made in the present invention it is extremely difficult to remove once mounted in place. The edges cannot readily be grasped to peel the ring from the recess 84, and the barbs 104 at the bottoms of the wall 98 below the shoulder 28 require considerable deformation before they can be withdrawn. The bead 90 which further defines the recess 84 at the outer edge adds additional protection to the edge of the ring 18 making it increasingly difficult to lift the ring out of place.

In the drawing it will be noted that the hub is lined for metal, and the reel flanges and identifying and lockout rings are lined for plastic. Preferably the hub is made of aluminum and the other parts are made of some thermoplastic material. However, this is not essential, and other materials may be used. When different materials are used for the different parts, preferably space should be provided for differential expansion of the different parts, and the adhesive materials should allow for this relative change in position.

It should also be noted that because the identifying ring lies opposite the web of the hub, if the flanges are made of clear plastic the ring will serve to hide the tongues, etc., of the flanges to cover the relatively unattractive mechanical features which join the different parts together. Very often the reels are made with opaque rear flanges and transparent front flanges, and with the ring confined to the region of the hub the tape on the reel is visible and the opaque ring will hide the unsightly mechanical features.

Having described this invention in detail, those skilled in the art will appreciate that numerous modifications may be made of this invention without departing from its spirit. Therefore it is not intended to limit the breadth of this invention to the single embodiment illustrated and described. Rather, it is intended that the scope of this invention be determined by the appended claims and their equivalents.

What is claimed is:

1. A reel comprising
a hub made of aluminum having an inner wall designed to fit on a reel support,
means defining spaced openings in the hub,
a plastic back reel flange secured to one side of the hub,
a plastic front reel flange secured to the other side of the hub with the inner edge of the front flange being spaced from the inner wall of the hub to define an annular gap between them,
inwardly projecting means formed as integral parts of each of the reel flanges secured together in the openings to retain the two flanges on the hub,
means defining a continuous recess in the outer surface of the front reel flange adjacent the inner edge of the front reel flange,
and a color coded identifying ring disposed in the recess and having inwardly projecting means disposed in the gap for permanently anchoring the ring in the recess.

2. A reel as defined in claim 1 further characterized by the plastic front reel flange being transparent.

3. A reel comprising
a hub having inner and outer hub flanges with the inner hub flange designed to fit on a reel support and the outer hub flange designed to support the load of tape wound on the reel, said flanges being connected by a web,
a front transparent reel flange and a back reel flange each fabricated separately from the hub and secured together in the region of the web,
means defining a continuous recess in the outer surface of the front reel flange opposite the web,
and an identifying ring secured in the recess and covering the connection of the reel flanges at the region of the web.

4. A reel as defined in claim 3 further characterized by said hub being made of aluminum and said front and rear flanges being made of plastic material.

5. A reel as defined in claim 3 further characterized by means defining spaced openings in the web,
and inwardly projecting means formed as integral parts of the reel flanges secured together in the openings to retain the two reel flanges on the hub.

6. A reel comprising
a hub having inner and outer generally cylindrical surfaces with each surface having front and rear edges,
a front reel flange made of transparent plastic and extending over the front edge of the outer cylindrical surface and terminating radially outwardly of the inner cylindrical surface,
a rear plastic reel flange extending over the rear edge of the outer cylindrical surface and terminating radially outwardly of the inner cylindrical surface,
means joining the two plastic reel flanges and the hub,
a shallow annular recess provided on the outer surface of the front reel flange disposed with its inner circular edge at the front edge of the inner cylindrical surface and with the bottom surface of the recess at the circular edge lying beneath the front edge of the inner cylindrical surface,
an annular opaque identifying ring disposed in the recess with its outer surface at its inner edge lying beneath the front edge of the inner cylindrical surface,
and means forming part of the front reel flange extending beyond the outer edge of the ring.

References Cited

UNITED STATES PATENTS

| | | | |
|---|---|---|---|
| 2,902,235 | 9/1959 | Morin | 40—309 X |
| 2,908,093 | 10/1959 | Curry | 40—309 |
| 2,990,133 | 6/1961 | Tucker | 40—309 X |
| 3,088,689 | 5/1963 | Perlini | 242—71.8 |
| 3,229,928 | 1/1966 | Burgess et al. | 242—71.8 |

FOREIGN PATENTS

| | | |
|---|---|---|
| 366,227 | 1/1963 | Switzerland. |

EUGENE R. CAPOZIO, *Primary Examiner.*

W. GRIEB, *Assistant Examiner.*